(12) United States Patent
Martin et al.

(10) Patent No.: US 11,122,091 B2
(45) Date of Patent: Sep. 14, 2021

(54) NETWORK SECURITY AND MANAGEMENT SYSTEM

(71) Applicant: FireMon, LLC, Overland Park, KS (US)

(72) Inventors: Jeremy Ned Martin, Kansas City, KS (US); Matthew R. Dean, Stilwell, KS (US); Timothy R. Garrett, Shawnee, KS (US); Sean Michael Mills, Kansas City, MO (US); Lindsay V. Brechler, Overland Park, KS (US); Jason Wendel, Kansas City, KS (US); Hugh D. Brown, Olathe, KS (US); Patrick G. Clark, Overland Park, KS (US); Joseph P. Brazil, Jr., Shawnee, KS (US)

(73) Assignee: FireMon, LLC, Overland Park, KS (US)

( * ) Notice: Subject to any disclaimer, the term of this patent is extended or adjusted under 35 U.S.C. 154(b) by 112 days.

(21) Appl. No.: 16/385,665

(22) Filed: Apr. 16, 2019

(65) Prior Publication Data

US 2020/0336513 A1    Oct. 22, 2020

(51) Int. Cl.
*H04L 29/06* (2006.01)
*H04L 29/12* (2006.01)
*H04L 12/26* (2006.01)

(52) U.S. Cl.
CPC ............ *H04L 63/205* (2013.01); *H04L 43/08* (2013.01); *H04L 61/2007* (2013.01); *H04L 61/256* (2013.01); *H04L 63/0263* (2013.01); *H04L 63/1408* (2013.01)

(58) Field of Classification Search
CPC . H04L 63/205; H04L 63/0263; H04L 61/256; H04L 43/08; H04L 61/2007; H04L 63/1408; H04L 63/20; H04L 63/0227; H04L 63/02; H04L 63/10; H04L 41/0893; H04L 63/105; H04L 63/0272; H04L 63/101; H04L 63/1433; H04L 63/104; H04L 63/102; H04L 63/1425; H04L 63/1416; H04L 63/0209; H04L 63/1441; H04L 63/14; H04L 63/0281; G06F 21/604; G06F 21/6218; G06F 2221/2141; G06F 21/577; H04W 12/08
See application file for complete search history.

(56) References Cited

U.S. PATENT DOCUMENTS 6,651,191 B1 * 11/2003 Vacante .............. H04L 41/0893
714/47.1
8,418,135 B2 * 4/2013 Proctor .................. G06N 5/022
717/117
9,059,960 B2 * 6/2015 Burchfield .............. H04L 63/20
(Continued)

*Primary Examiner* — David Garcia Cervetti
(74) *Attorney, Agent, or Firm* — Hovey Williams LLP

(57) ABSTRACT

Systems and methods for managing network security for a plurality of networks. Each of the networks comprises one or more networked devices, and each of the networks includes one or more security devices configured to monitor data traffic into and out of the networks. Abstracted access rules are created to define access between the networked devices. Each of the access rules are compiled into a security rule that uses object definitions of the networked devices to define access between the networked devices. The security rules are compiled and transmitted to the security devices for implementation.

26 Claims, 9 Drawing Sheets

(56) References Cited

U.S. PATENT DOCUMENTS

| | | | |
|---|---|---|---|
| 9,270,704 B2 | 2/2016 | Clark et al. | |
| 9,521,115 B1* | 12/2016 | Woolward | H04L 63/1416 |
| 9,578,061 B2 | 2/2017 | Clark et al. | |
| 10,263,783 B2* | 4/2019 | Bohli | G06F 21/64 |
| 2004/0025173 A1* | 2/2004 | Levonai | H04L 41/12 |
| | | | 719/328 |
| 2005/0132202 A1* | 6/2005 | Dillaway | H04L 9/3226 |
| | | | 713/179 |
| 2005/0160399 A1* | 7/2005 | Kumar | G06F 8/427 |
| | | | 717/104 |
| 2005/0251853 A1* | 11/2005 | Bhargavan | H04L 63/12 |
| | | | 726/1 |
| 2006/0085465 A1* | 4/2006 | Nori | G06F 16/213 |
| 2006/0153208 A1* | 7/2006 | Costanzo | H04L 41/046 |
| | | | 370/401 |
| 2006/0184490 A1* | 8/2006 | Heim | H04L 41/0873 |
| | | | 706/46 |
| 2006/0294575 A1* | 12/2006 | Rogers | H04L 63/0428 |
| | | | 726/1 |
| 2007/0112745 A1* | 5/2007 | Dettinger | G06F 16/289 |
| 2007/0156659 A1* | 7/2007 | Lim | H04L 41/0893 |
| 2007/0180490 A1* | 8/2007 | Renzi | H04L 63/145 |
| | | | 726/1 |
| 2007/0288663 A1* | 12/2007 | Shear | H04L 69/40 |
| | | | 709/249 |
| 2008/0034350 A1* | 2/2008 | Conti | G06F 21/74 |
| | | | 717/124 |
| 2008/0127337 A1* | 5/2008 | Dawson | H04L 63/1416 |
| | | | 726/22 |
| 2008/0256047 A1* | 10/2008 | Dettinger | G06F 16/90335 |
| 2008/0270447 A1* | 10/2008 | Arends | G06F 16/24564 |
| 2008/0288235 A1* | 11/2008 | Dettinger | G06F 16/367 |
| | | | 703/23 |
| 2009/0132456 A1* | 5/2009 | Dettinger | G06N 5/025 |
| | | | 706/47 |
| 2009/0222674 A1* | 9/2009 | Leichsenring | G06F 21/51 |
| | | | 713/193 |
| 2010/0153918 A1* | 6/2010 | Mallick | G06F 8/71 |
| | | | 717/121 |
| 2011/0119651 A1* | 5/2011 | Utschig-Utschig | G06F 8/35 |
| | | | 717/107 |
| 2011/0154010 A1* | 6/2011 | Springfield | H04L 9/3234 |
| | | | 713/100 |
| 2011/0179477 A1* | 7/2011 | Starnes | H04L 63/12 |
| | | | 726/9 |
| 2013/0268258 A1* | 10/2013 | Patrudu | G06F 40/40 |
| | | | 704/2 |
| 2014/0173761 A1* | 6/2014 | Hong | G06F 21/10 |
| | | | 726/30 |
| 2014/0298420 A1* | 10/2014 | Barton | H04L 63/10 |
| | | | 726/4 |
| 2015/0271679 A1* | 9/2015 | Park | H04W 12/37 |
| | | | 713/187 |
| 2016/0014155 A1* | 1/2016 | Brucker | H04L 63/102 |
| | | | 726/1 |
| 2016/0188676 A1 | 6/2016 | Barker et al. | |
| 2016/0294559 A1* | 10/2016 | Dabak | G06F 9/45558 |
| 2016/0366141 A1* | 12/2016 | Smith | H04W 12/041 |
| 2017/0005822 A1* | 1/2017 | Gao | H04L 12/2809 |
| 2017/0147819 A1* | 5/2017 | Vasilenko | G06F 21/554 |
| 2017/0185774 A1* | 6/2017 | Sahita | G06F 21/577 |
| 2017/0230425 A1* | 8/2017 | Knjazihhin | H04L 41/28 |
| 2017/0242719 A1* | 8/2017 | Tsirkin | G06F 9/4403 |
| 2017/0250972 A1* | 8/2017 | Ronda | H04L 63/123 |
| 2017/0257361 A1* | 9/2017 | Niemela | G06F 21/51 |
| 2017/0357496 A1* | 12/2017 | Smith | H04L 9/3228 |
| 2018/0018459 A1* | 1/2018 | Zhang | G06F 21/554 |
| 2018/0019876 A1* | 1/2018 | Moss | G06F 21/64 |
| 2018/0191739 A1* | 7/2018 | Kraft | G06F 21/566 |
| 2018/0198626 A1* | 7/2018 | Kroonmaa | H04L 9/0637 |
| 2018/0270200 A1* | 9/2018 | Byrne | H04L 63/0263 |
| 2019/0087296 A1 | 3/2019 | Tom | |
| 2019/0123890 A1* | 4/2019 | Scott | H04L 9/0643 |
| 2019/0156023 A1* | 5/2019 | Gerebe | H04L 9/3226 |
| 2019/0163911 A1* | 5/2019 | Kliewer | H04L 9/3239 |
| 2019/0207769 A1* | 7/2019 | Donohoe | G06F 21/6245 |
| 2019/0222575 A1* | 7/2019 | Oberhauser | H04L 63/0869 |
| 2019/0245680 A1* | 8/2019 | Boutaba | G06F 21/64 |
| 2019/0272291 A1* | 9/2019 | Imai | G06F 16/00 |
| 2019/0334920 A1* | 10/2019 | Kelly | H04L 9/3239 |
| 2019/0364072 A1* | 11/2019 | Purusothaman | H04L 63/0281 |
| 2020/0057760 A1* | 2/2020 | Zhao | G06F 16/27 |
| 2020/0076613 A1* | 3/2020 | Ciscato | H04L 9/3247 |
| 2020/0204557 A1* | 6/2020 | Singh | H04L 9/0637 |
| 2020/0250344 A1* | 8/2020 | Rahn | H04L 9/3247 |

* cited by examiner

| Rule | Source IP Address | Destination IP Address | Protocol/Port | Action |
|---|---|---|---|---|
| 1 | 192.168.30.0 | Outside 192.168.30.0 | TCP/80 | Allow |
| 2 | 192.168/16 | Outside 192.168/16 | UDP/53 | Allow |
| 3 | All | All | All | Deny |

FIG. 2

| Name | Type | Definition |
|---|---|---|
| Webservers | Asset | 192.0.2.0/24 |
| Admins | Asset | 198.51.100.0/24 |
| Load Balancers | Asset | 203.0.113.0/24 |
| Any Internet | Asset | Excludes (192.0.2.0/24, 198.51.100.0/24, 203.0.113.0/24) |
| SSH | Service | TCP/22 |
| HTTP | Service | TCP/80 |
| HTTPS | Service | TCP/443 |
| Servers | Tag | Webservers, Load Balancers |

FIG. 8

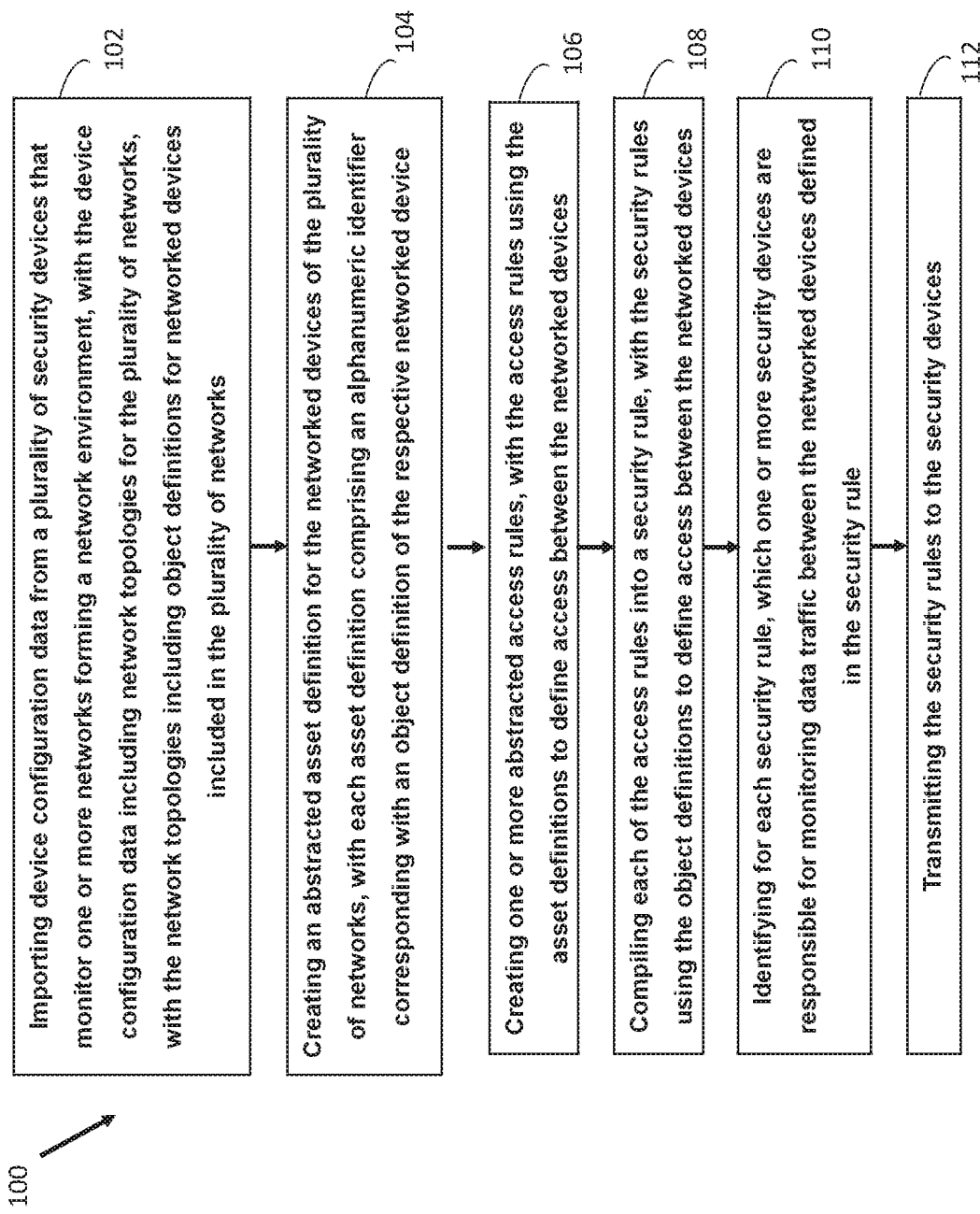

NETWORK SECURITY AND MANAGEMENT SYSTEM

FIELD OF THE DISCLOSURE

Embodiments of the present invention are directed to systems and methods for network security and management. In more detail, embodiments of the present invention are directed to systems and methods for managing the security of network devices governed by security devices for one or more networks.

BACKGROUND

Computer networking is now commonplace in today's interconnected world. Nearly all businesses and organizations use computing devices and computer-based applications to store data, to exchange information, and to conduct business. Computer networks facilitate such functionality by establishing a framework for communication between computing devices, applications, and other networks.

Given the interconnectedness of today's computing devices and applications, network security is of utmost importance. Without security, the speed and accuracy of network communications can be severely affected, and sensitive data can be open to destruction and theft. To mitigate such risks, security devices, such as firewalls, are typically deployed in computer networks. In general, security devices comprise software or hardware-based devices that control incoming and outgoing traffic through a network using an ordered set of security rules. A collection of security rules for a given security device is commonly known as a security policy (e.g., a firewall policy).

Traditional network security management has taken the form of management programs that are specifically focused on managing a single security device. Thus, previous network managing has generally consisted of managing individual security policy (or policies) for each security device in a network or a system of networks. However, the network landscape used in today's business world has been significantly expanding due to a combination of various, rapidly-emerging technologies, such virtualization, cloud-based computing, Internet-of-Things, and mobile computing. Such expansion of the network landscape has required the use of numerous security devices, each of which might be provided by a different security device vendor. As such, accurately and competently managing the numerous security devices (and associated security policies) is more difficult than ever, and continues to increase in complexity. Such complexity leads to time-consuming and error-prone work by network managers and engineers. Such problems can be exacerbated by the need to update security policies as quickly as possible. As such, network security management can quickly become overwhelming for such network managers and engineers.

It is with these and other issues in mind that various aspects of the present disclosure were developed. The background discussion is intended to provide information related to the present invention which is not necessarily prior art.

SUMMARY OF THE INVENTION

One embodiment of the invention includes a network security system comprising a plurality of networks, with each network comprising one or more networked devices. The system additionally includes a plurality of security devices configured to monitor data traffic into and out of the networks. The system further includes a computing device in communication with the security devices. The computing device comprises at least one processing element and at least one memory element. The at least one processing element is configured to execute a computer program stored in the at least one memory element such that the computing device is configured to import device configuration data from the plurality of security devices. The device configuration data comprises network topologies for the plurality of networks. The network topologies include object definitions for the networked devices included in the plurality of networks. The computing device is additionally configured to create an abstracted asset definition for the networked devices of the plurality of networks, with each asset definition comprising an alphanumeric identifier corresponding with an object definition of the respective networked device. The computing device is additionally configured to create one or more abstracted access rules. The access rules use the asset definitions to define access between the networked devices. The computing device is additionally configured to compile each of the access rules into a security rule. The security rules use the object definitions to define access between the networked devices. The computing device is additionally configured to identify for each security rule which one or more security devices are responsible for monitoring data traffic between the networked devices defined in the security rule. The computing device is further configured to transmit the security rules to the security devices.

Another embodiment of the invention includes a computer-implemented method for performing security management for a plurality of networks. Each of the networks comprises one or more networked devices, and each of the networks includes one or more security devices configured to monitor data traffic into and out of the networks. One step of the method includes importing device configuration data from the plurality of security devices. The device configuration data comprises network topologies for the plurality of networks. The network topologies include object definitions for the networked devices included in the plurality of networks. An additional step includes creating an abstracted asset definition for the networked devices of the plurality of networks, with each asset definition comprising an alphanumeric identifier corresponding with an object definition of the respective networked device. An additional step includes creating one or more abstracted access rules. The access rules use the asset definitions to define access between the networked devices. An additional step includes compiling each of the access rules into a security rule. The security rules use the object definitions to define access between the networked devices. An additional step includes identifying for each security rule, which one or more security devices are responsible for monitoring data traffic between the networked devices defined in the security rule. A further step includes transmitting the security rules to the security devices.

Yet another embodiment of the invention includes a non-transitory computer-readable storage medium with an executable program stored thereon for performing network security management for a plurality of networks. Each of the networks comprises one or more networked devices, and each of the networks includes one or more security devices configured to monitor data traffic into and out of the networks. When the program is executed by a processor, the processor is configured to perform a number of steps. One step includes importing device configuration data from the plurality of security devices. The device configuration data comprises network topologies for the plurality of networks.

The network topologies include object definitions for the networked devices included in the plurality of networks. An additional step includes creating an abstracted asset definition for the networked devices of the plurality of networks, with each asset definition comprising an alphanumeric identifier corresponding with an object definition of the respective networked device. An additional step includes creating one or more abstracted access rules. The access rules use the asset definitions to define access between the networked devices. An additional step includes compiling each of the access rules into a security rule. The security rules use the object definitions to define access between the networked devices. An additional step includes identifying for each security rule which one or more security devices are responsible for monitoring data traffic between the networked devices defined in the security rule. A further step includes transmitting the security rules to the security devices.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 2 is a table illustrating a security policy with a plurality of security rules by which a security device can govern data traffic into and out of a network;

FIG. 8 is a table illustrating abstracted asset definitions, abstracted service definitions, and abstracted tag definitions; and FIG. 9 is a flowchart illustrating a method for performing network security management according to embodiments of the present invention.

Figure 1:
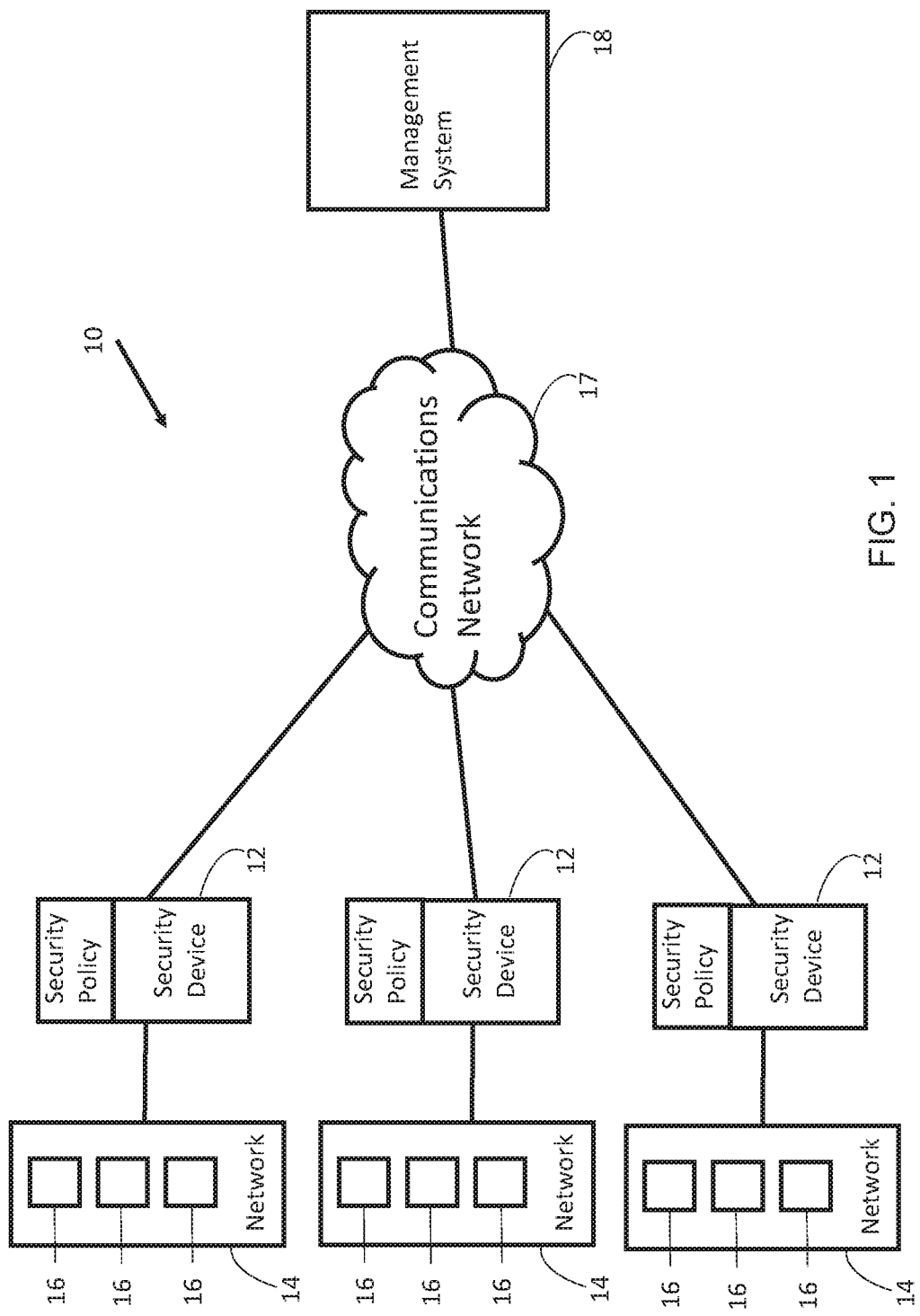
FIG. 1 is a schematic block diagram of a network security system constructed in accordance with embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A network security system 10 constructed in accordance with various embodiments of the present invention is illustrated in FIG. 1. Broadly, the network security system 10 may be configured to manage the creation, the maintenance/updating, and the distribution of security policies and/or security rules for a plurality of security devices 12 that each govern data traffic for one or more networks 14. Although FIG. 1 illustrates the system 10 having only three security devices 12 and three networks 14, the system 10 of embodiments of the present invention may include hundreds or thousands of security devices 12 and networks 14, which may all be interconnected according to various arrangements of network environments. In addition, in some instances, each security device 12 may be associated with a middle-tier management system (not shown), with such middle-tier management systems being used to at least partially manage the security devices 12. The system 10 and methods described herein overcome problems specifically arising in computer technology by using a solution necessarily rooted in computer technology and computer networks. Accordingly, the network security system 10 and any method steps performed thereby (as described herein) may be implemented in hardware, software, firmware, or combinations thereof.

In more detail, embodiments of the present invention include the network management system 10, which may include any number of networks 14. The networks 14 may each be configured to interconnect a plurality of networked devices 16 that may form nodes within the respective network 14. In more detail, the networks 14 may each comprise a hardware or software-based network, and in some specific embodiments, may form a local area network (LAN). Alternatively, or in addition, the networks 14 may be wired or wireless and may include wireless receivers and transmitters, and the like, as well as electrically conductive cables or optical cables that form routes between the nodes. The networks 14 may alternatively include local metro or wide area networks, as well as other cloud-based or virtual networks.

The networked devices 16 within the respective networks 14 (and which may form the nodes of the network 14) may comprise various types of computing devices configured to send and receive communication data or traffic in the form of communication packets, as will be discussed in more detail blow. As such, the networked devices 16 may include physical computing devices with (or with access to) processing elements and memory elements, such as workstations, desktop computers, personal computers, laptops, smartphones, tablets, and the like, and/or one or more routing devices, such as servers (e.g., application servers, database servers, file servers, mail servers, print servers, web servers), routers, switches, or the like, or combinations thereof. Alternatively, or in addition, the networked devices 16 may comprise software-based computing devices, such as virtual machines and/or cloud instances. Further still, the networked devices 16 may themselves comprise networks 14. As noted above, in general, the networked devices 16 may include any type of device, machine, network, or group thereof with (or with access to) processing elements for processes communication data. Furthermore still, in some embodiments, the networked devices 16 may comprise computer programs, applications, or other software-based instances.

The security devices 12 may comprise various types of hardware or software-based devices or applications that are configured and/or programmed to govern the networks 14 by monitoring and/or controlling incoming and outgoing data traffic to/from the networks 14 (e.g., through an ordered set of security rules that form one or more security policies). For example, the security devices 12 may comprise firewalls, routers, switches, or combinations thereof, or other monitoring/control devices and/or intrusion detection systems (IDS), intrusion prevention systems (IPS), network monitors, system loggers, and/or the like.

The system 10 shown in FIG. 1 may also include a communications network 17, which may be used to facilitate communication for various components of the system 10. The communications network 17 may be wired or wireless and may include servers, routers, switches, wireless receivers and transmitters, and the like, as well as electrically conductive cables or optical cables. In some embodiments, the communications network 17 may be similar to the network 14 previously described (e.g., a LAN). Alternatively, the communications network 17 may comprise a metro or wide area networks such as the Internet or other cloud networks. Furthermore, the communications network 17 may include cellular or mobile phone networks, as well as landline phone networks, public switched telephone networks, fiber optic networks, or the like. In some embodiments, the networks 14 will be configured to communicate (e.g., transfer communications data) with each other via the communications network 17. Alternatively, or in addition, the networks 14 may be configured to communicate directly between each other (e.g., directly through one or more interconnected security devices 12).

In more detail, the security devices 12 may generally be positioned at the entry points of the networks 14 so as to ensure that all data traffic (e.g., communication packets) passes through the security devices to enter the networks. As such, the security devices 12 generally operate to govern the networks 14 by monitoring, analyzing, and potentially filtering communication packets transmitted to/from the networks 14. Operation of the security devices 12 is described in more detail below. One of ordinary skill in the art will recognize the various ways and communication protocols through which the networks 14 can connect to each other and to the communications network 17 via the security devices 12. For simplicity, the various additional configurations for connecting components of the system 10 (apart from that shown in FIG. 1) are omitted.

As noted above, the security devices 12 may comprise firewalls that allow the networks 14 to communicate with each other and with other remote networks (e.g., via the communications network 17) through the transfer of communication packets, while securing the network 14 behind the security devices 12. The typical placement of a security device 12 may be at the entry point into a network 14 so that all data traffic passes through the security device 12 to enter or leave the network 14. The traffic that passes through the security devices 12 is typically based on existing packet-based protocols, and a communication packet can be thought of as a tuple with a set number of fields. For example, a communication packet may include such fields as a source internet protocol (IP) address (e.g., IPv4 or IPv6), a destination IP address (e.g., IPv4 or IPv6), port number, and/or a protocol field, among other fields. A security device 12, such as firewall, may be configured to analyze each communication packet that travels through it and, based on such analysis, decide if the communication packet should be allowed to pass through the security device 12 on to its associated network 14. Such analysis of the communication packet may be based on one or more security policies implemented by the security device 12. As will be described in more detail below, a security policy may comprise a sequential listing of security rules that relates to the values of the one or more fields in the communication packets. For example, a communication packet will generally include a source IP address and a destination IP address. A security device 12 may compare those source/destination IP addresses with related fields in its security rule to determine whether or not the communication packet is allowed into or out of the network 14. In addition, the security device 12 may also analyze routing information (e.g., as provided in routing tables) to determine whether or not the communication packet is allowed into or out of the network 14. For instance, based on a comparison with one or more security rules, the security device 12 may determine that any communication packet with a particular source IP address should be denied entry into the network 14.

In more detail, a security policy implemented by a security device 12 will generally comprise an ordered list of security rules. FIG. 2 illustrates an exemplary security policy 20 having three security rules (i.e., rules 1-3). The security policy 20 is illustrated as a table, with each row (other than the header row) comprising a security rule. The security rules are numbered in the far-left column 22. In addition, each security rule includes a field for a source (e.g., an IP address) listed in column 24, a destination (e.g., an IP address) listed in column 26, a communications protocol and/or port (e.g., a port number) listed in column 28, and an action to be taken listed in column 30. As such, a security device 12 can process a communication packet by sequentially comparing the information within the fields of the communication packet with the values included in each of the security rules. The security device 12 attempts to match some aspect of the communication packet to the security rules, one rule at a time, from the first-listed security rule to the last. Matching the communication packet means that the security device 12 evaluates a communication packet based on the fields in the communication packet to determine if the information within such fields matches the values identified in one of the security rules. Upon matching the communication packet with one of the security rules, the security device 12 can enact the action listed in the security rule (e.g., allow or deny the communication packet to pass). The security rules do not necessarily need to contain a value for all possible fields in a communication packet, and security rules can sometimes contain an "any" variable in a field to indicate that the security rule is a "do not care" condition for that variable. In general, security rules of a security policy are processed in order, from top to bottom, until the security device 12 finds a match and takes the appropriate action identified by the action portion of the security rule.

In further embodiments of the present invention, as shown in FIG. 1, the system 10 may include a management system 18 that is configured to generate and to provision security policies and/or security rules to the security devices 12, such that the security devices 12 can govern data traffic into and out of the networks 14. As such, the management system 18 may be configured to communicate with the networks 14 (including with the networks' 14 security devices 12) via the communications network 17. In general, the management system 18 may be a computing system or computing device, such as a desktop or laptop computer with one or more software programs (e.g., instructions, commands, code, code segments, executables, applications, apps, and the like.) stored thereon for performing certain of the operations described herein. As such, the management system 18 may be a special purpose computer that is programmed to perform the operations, methods, steps, tasks, an/or algorithms, disclosed herein. Furthermore, embodiments in which the security devices 12 are associated with middle-tier management systems, as discussed above, the management system 18 of embodiments of the present invention may be configured to communicate with and/or work in conjunction with such middle-tier management systems during management of the security devices 12.

In more detail, the management system 18 may include one or more processing elements and memory elements. The processing elements comprise processors, microprocessors, microcontrollers, field programmable gate arrays, and the like, or combinations thereof. In addition, the processing elements may include one or more internal levels of cache (not shown). The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray and the like, or combinations thereof. In addition to these memory elements, the management system 18 may further include file stores comprising a plurality of hard disk drives, network attached storage, or a separate storage network (not shown).

The management system 18 may specifically include mobile communication devices (including wireless devices), work stations, desktop computers, laptop computers, palm-top computers, tablet computers, portable digital assistants (PDA), smart phones, and the like, or combinations thereof. In preferred embodiments, the management system 18 will have an electronic display, such as a cathode ray tube, liquid crystal display, plasma, or touch screen that is operable to display visual graphics, images, text, etc. In certain embodiments, the computer program of the present invention facilitates interaction and communication through a graphical user interface (GUI) that is generated by the computer system 18 and displayed via the electronic display. The GUI enables the user to interact with the electronic display by touching or pointing at display areas to provide information to the user control interface, which is discussed in more detail below.

The management system 18 may further include a user control interface comprising one or more input/output devices that enable one or more users to share information and commands with the computer system 18. The user control interface may comprise one or more functionable inputs such as buttons, keyboard, switches, scrolls wheels, voice recognition elements such as a microphone, pointing devices such as mice, touchpads, tracking balls, styluses, etc. The user control interface may also include a speaker for providing audible instructions and feedback. In some embodiments, the user control interface may include the electronic display that is used to present the GUI. Further, the user control interface may comprise wired or wireless data transfer elements, such as a communication component, removable memory, data transceivers, and/or transmitters, to enable the user and/or other computing devices to remotely interface with the management system 18.

In some embodiments, users may interact with the management system 18 via an application programming interface (API). Such an API may be in the form of a computer program/application, a set of routines/protocols, and/or other software tool(s) for facilitating communication and data transfer to/from the management system 18. The API may be accessed using software such as a command line prompt, a web browser, and/or otherwise through execution of one or more script(s).

According to one or more embodiments, the operations discussed herein may be performed by the management system 18 in response to the processing elements executing one or more sequences of one or more instructions contained in the memory elements. These instructions may be read into memory elements from another machine-readable medium, such as a storage device. Execution of the sequences of instructions contained in memory elements may cause the processing elements to perform the process steps described herein. In alternative embodiments, circuitry may be used in place of or in combination with the software instructions. Thus, embodiments of the present disclosure may include both hardware, firmware, and/or software components.

Figure 3:
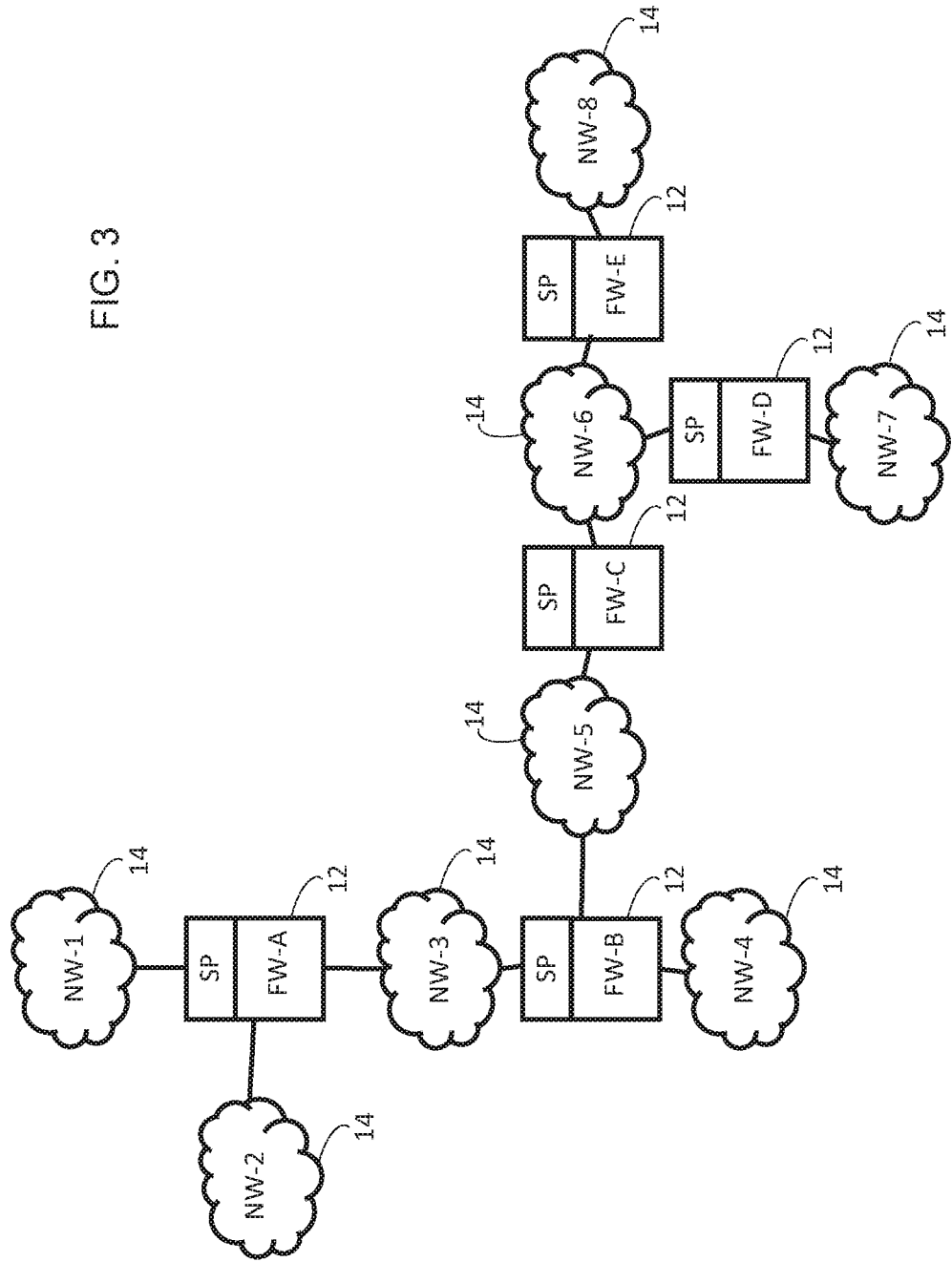
FIG. 3 is an exemplary network environment that may implement systems and methods of the present invention.

To illustrate an issue that can arise with even non-complex network environments, an exemplary network environment is illustrated in FIG. 3. For clarity, the term "network environment" used herein is meant to refer to an arrangement of interconnected networks 14 and/or associated security devices 12. The network environment illustrated in FIG. 3 includes eight networks 14. The networks 14 of FIG. 3 are individually referred to as "NW-1," "NW-2," "NW-3," "NW-4," "NW-5," "NW-6," "NW-7," and "NW-8." Such networks 14 may each include a plurality of networked devices 16 (not shown in FIG. 3). Communication between the networks 14 (e.g., communication between networked devices 16 within the disparate networks 14) is governed (e.g., allowed or denied) by five security devices 12. The security devices 12 illustrated in FIG. 3 comprise firewalls and are individually referred to as "FW-A," "FW-B," "FW-C," "FW-D," and "FW-E." As such, "FW-A" governs communication into and out of "NW-1," "NW2," and "NW-3." Similarly, "FW-B" governs communication into and out of "NW-3," "NW4," and "NW-5." "FW-C" governs communication into and out of "NW-5" and "NW-6." "FW-D" governs communication into and out of "NW-6" and "NW-7." And, finally, "FW-E" governs communication into and out of "NW-6" and "NW-8."

Each security device 12 governs communication between the networks 14 based on one or more security policies for each security device 12. The security policies are represented in FIG. 3 within the security devices 12 via the initials "SP." The security policies may be unique, or at least implemented uniquely, because each security device 12 protects different networks 14 within the network environment of FIG. 3. For example, the exemplary security policy 20 of FIG. 2 may be used by "FW-A" to govern communication (i.e., the transfer of communication packets) into and out of its networks "NW-1," "NW-2," and "NW-3." In particular, the set of security rules that make up the security policy 20 of FIG. 2 includes the three security rules, numbered in the far-left column 22 of the security policy. As was previously noted, column 30 indicates the action taken for each of the security rules when the conditions of the security rules are met. As shown in column 30, the security policy 20 either provides for allowing or denying the communication packet into (or out of) the associated networks 14 when the conditions of the given security rule are met. Although only two actions are shown in the security policy 20 of FIG. 2 (e.g., allow or deny), other actions may also be taken by "FW-A," such as logging.

Figure 4:
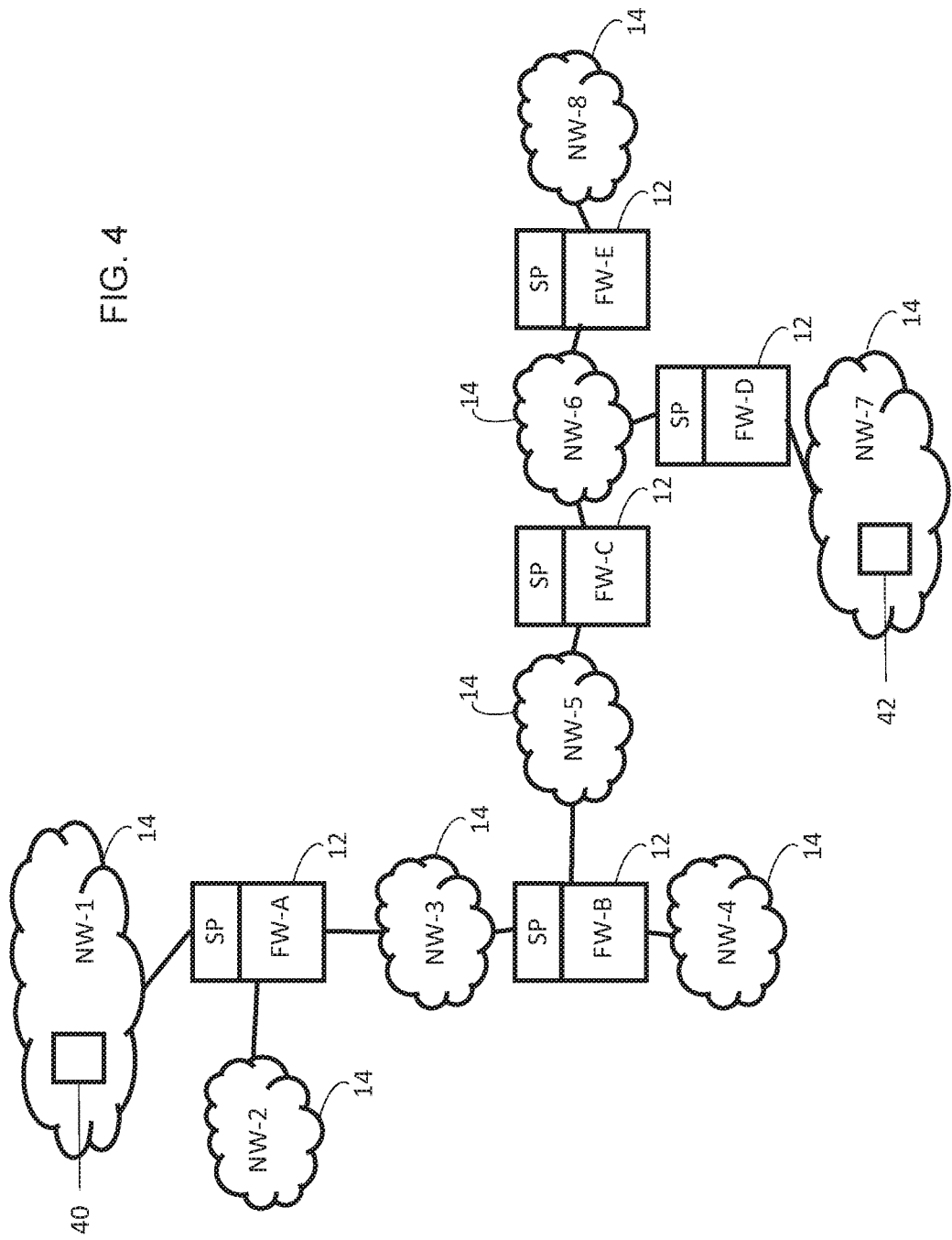
FIG. 4 is the exemplary network environment from FIG. 3 with a first server and a second server added to the network environment.

Referring again to FIG. 3, for a networked device within "NW-1" to communicate with (e.g., to send a communications packet to) a networked device within "NW-8", such a communications packet would be required to traverse four firewalls, namely "FW-A," "FW-B," "FW-C," and "FW-E." It should be understood, therefore, that if changes are made to any of the networks 14 (e.g., addition or removal of networked devices 16, changes in network topology, etc.), such changes may require a corresponding change to the security policies of each affected security device 12. For example, as illustrated in FIG. 4, a new networked device (e.g., a server 40) is added to "NW-1," and a new networked device (e.g., a server 42) is added to "NW-7." If server 40 is required to communicate with server 42, four security policies within the network environment may need to be changed. In particular, the security policies for each of "FW-A," "FW-B," "FW-C," and "FW-D" may need to be modified so as to permit communication between server 40 and server 42. In particular, a new security rule (See, e.g., Table 1 below showing new security rule) permitting communication between server 40 and server 42 may need to be added to each of the security policies for "FW-A," "FW-B," "FW-C," and "FW-D". In particular, the new security rule indicates that communication is allowed from server 40 (as identified by exemplary IP address: 192.168.40.0) to server 42 (as identified by exemplary IP address: 192.168.42.0) via communication protocol/port TCP 80.

TABLE 1

| Source | Destination | Protocol/Port | Action |
| --- | --- | --- | --- |
| 192.168.40.0 (server 40) | 192.168.42.0 (server 42) | TCP/80 | Allow |

Figure 5:
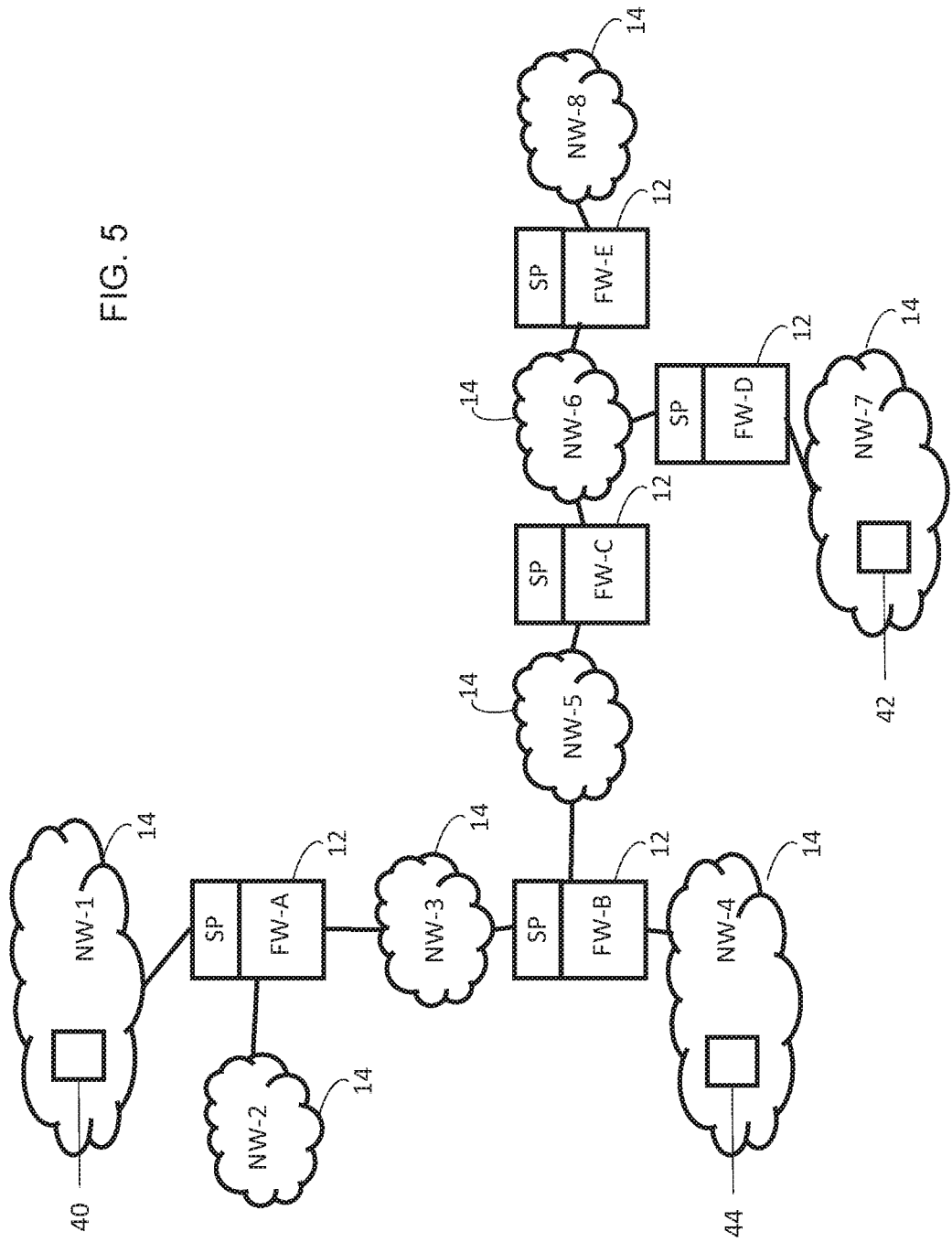
FIG. 5 is the exemplary network environment of FIGS. 3 and 4, with a third server added to the network environment.

Continuing with the illustration, a new networked device (e.g., a server 44) is added to "NW-4," as shown in FIG. 5. To enable communication between new server 44 and server 42, three security policies will need to be modified, namely the security policies for "FW-B," "FW-C," and "FW-D." Thus, a new security rule (See, e.g., Table 2 below showing new security rule) permitting communication between server 44 (as identified by exemplary IP address: 192.168.44.0) and server 42 (as identified by exemplary IP address: 192.168.42.0) will need to be added to each of the security policies for "FW-B," "FW-C," and "FW-D."

TABLE 2

| Source | Destination | Protocol/Port | Action |
| --- | --- | --- | --- |
| 192.168.44.0 (server 44) | 192.168.42.0 (server 42) | TCP/80 | Allow |

Figure 6:
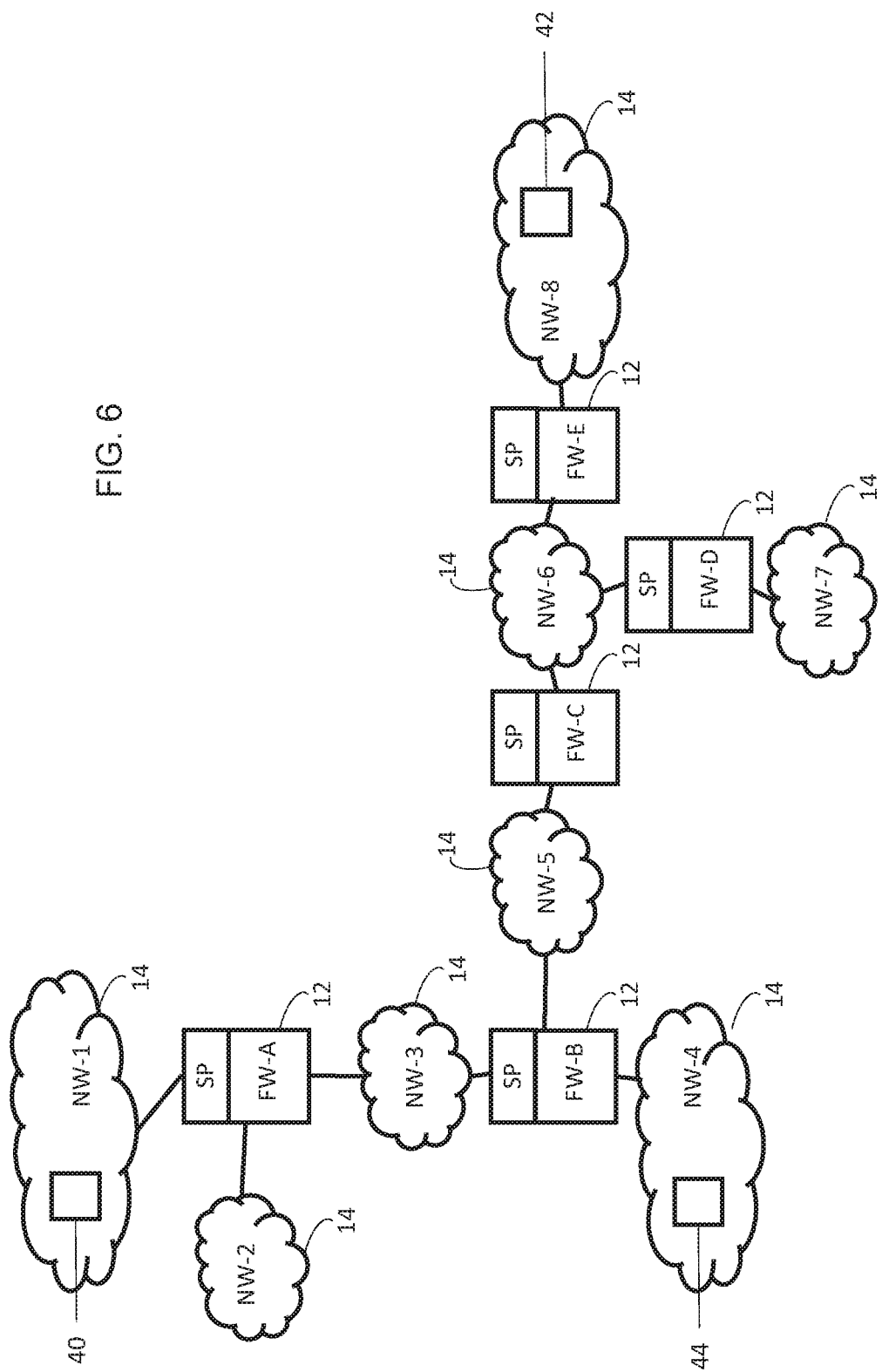
FIG. 6 is the exemplary network environment of FIGS. 3-5, with the second server moved within the network environment.

Finally, and referring now to FIG. 6, the network environment is changed by moving the server 42 from "NW-7" to "NW-8." Such a change will require the modification of all five security policies associated with the five security devices "FW-A," "FW-B," "FW-C," "FW-D," and "FW-E." Although the general communication requirements have not changed (i.e., both servers 40 and 44 still require communication with server 42), all of the security policies must be modified to permit such communication. In particular, the security policy for "FW-A" must be modified to identify the new location for server 42. Specifically, the security rule of Table 1, as was previously applied to "FW-A," must be modified to change the destination field of server 42 to correctly identify the new IP address of server 42. Similarly, both security rules of Tables 1 and 2 of the security policies for "FW-B" and "FW-C" must be modified with the new IP addresses for server 42. For the security policy of "FW-D," both security rules of Tables 1 and 2 are obsolete, and must now be removed. Finally, the security policy for "FW-E" must be updated with two new security rules (not shown) that enable communication between servers 40, 44 and server 42.

As can be appreciated via the above-provided illustration, it can be a complex and time-consuming task to manage security devices 12 of even non-complex network environments. Embodiments of the present invention provide an enhancement to network security management through use of a global security policy with which network environments can be managed based on abstracted business and/or access requirements between networks 14 and/or networked devices 16 of the network environment. Instead of individually managing a security policy per security device 12, a single global security policy can be managed that defines the access requirements of the network environment. For example, an access requirement for the above-provided example of FIGS. 3-6 might be that servers 40 44 require access to server 42 such that the servers 40, 44 can communicate with server 42. A global security policy according to embodiments of the present invention may identify such an access requirement based on one or two abstracted security rules (herein referred to as "access rules"). Whereas security devices 12 generally govern networks 14 by implementing security rules that are based on pre-defined locations of elements within the networks 14 (e.g., based on IP addresses of networked devices 16), access rules are created based on access requirements and define access between abstracted elements of networks 14. Such abstracted elements are defined as "assets" and are described in more detail below. Beneficially, changes in network topology, security infrastructure, and computing environment will generally not affect the access requirements of the network environment, and, thus, would not affect access rules. In contrast, however, such changes would often affect security rules of individual security policies that are enforced by security devices 12 within the network environment, as was previously illustrated.

Embodiments of the present invention abstract the creation and maintenance of access requirements (e.g., the intentions for communication within the network environment) from the enforcement of such access requirements. A global security policy, as generated by the management system 18, can be used to define the access requirements for the network environment using a plurality of abstracted access rules. As such, based on this global security policy, embodiments of the present invention can determine which access rules are required to be implemented on each of the security devices 12 and can automatically generate vendor-specific security polices and/or security rules that can be automatically provisioned to the necessary security devices 12 for implementation.

Such management may, in some embodiments, be performed by the management system 18, which was previously described. The management system 18 may perform its intended management via one or more of the below-described steps, which may represent code segments or executable instructions of a computer program or applications stored on the memory elements of the management system 18.

To manage one or more networks 14 forming a network environment (including managing one or more security devices 12 that govern the networks 14 within the network environment), the management system 18 of embodiments of the present invention may initially obtain device configuration data for each of the security devices 12 that are to be managed in the network environment. As was illustrated in FIG. 3, for instance, an exemplary network environment might include eight networks 14 interconnected via five security devices 12 (e.g., firewalls). Nevertheless, a given network environment may include any number of networks 14 and security devices 12, each being interconnected in various configurations. In some embodiments, the device configuration data for a given network 14 can be imported by the management system 18 directly from the security device 12 that governs the given network 14. Thus, the management system 18 may import device configuration data from each of the security devices 12 within the network environment. Alternatively, in some embodiments, a user may manually input device configuration data for each security device 12 into the management system 18.

The device configuration data for a security device 12 may include a network topology for the network(s) 14 being governed by the security device 12, as well as security profile information used by the security device 12 to govern its associated network(s) 14 or networks 14. Broadly, a network topology for a given network 14 includes the configuration or arrangement of elements within the network 14. Thus, the network topology forming the device configuration data may include (1) a listing (including locations and/or definitions) of networked devices 16 within the given network 14, (2) a listing (including locations and/or definitions) of networked devices 16 and networks 14 outside of the given network 14 to which networked devices 16 within the given network 14 may be connected, (3) a listing (including definitions and/or locations) of communication protocols used by the given network 14, (4) a listing of interfaces (e.g., physical and virtual) for the given network and which the security device 12 is responsible for governing, (5) a listing of routes (e.g., a routing table) extending between each networked device 16 within the given network 14 and/or routes to other networks 14 or networked devices 16 outside of the given network 14, and (6) a listing of any network address translations (NATs) and/or port translations applicable to the given network 14.

Broadly, the security profile information for a given security device 12 will include the information used by the security device 12 to govern its associated network(s) 14. Thus, the security profile information forming the device configuration data for a given security device 12 may include (1) a listing of all security policies currently being implemented by the given security device 12 to govern its associated network(s) 14, and/or (2) a listing of all security rules currently being implemented by the given security device 12 to govern its associated network(s) 14.

As was noted above, in some embodiments, the device configuration data may be imported directly by the management device 18. To accomplish such importation, the management device 18 will be required to establish a connection with those security devices 12 included within the network environment, such that the relevant device configuration data can be extracted. In some embodiments, the connection may be over the communications network 17 and may include connection via WAN (e.g., the Internet), a private network (e.g., virtual private network (VPN)), an application programming interface (API), or the like. In some embodiments, the management system 18 may be configured to connect with and import device configuration data from the security devices 12 manually (i.e., as needed), according to a predetermined or periodic schedule (e.g., every second, every minute, hourly, daily, weekly, monthly, etc.), or continuously by monitoring relevant indicators (.e.g., syslog) of the security devices 12.

Upon establishing connection with the security devices 12, the management system 18 can extract the device configuration data (as discussed above) from each of such security devices 12 within the network environment. In some embodiments, the management system 18 will normalize the network device configuration data into a structure suitable for consistent reference by the management system 18. Such a normalization feature is beneficial, particularly when disparate security devices 12 are used in a network environment. For instance, it is common for disparate security devices 12 of a network environment to be provided by various vendors (e.g. Check Point™, Cisco™, Amazon Web Services™, etc.), which each use individual configurations, command structures, syntaxes, etc.

In more detail, the management system 18 may normalize various portions of the network topology imported from the security devices 12, including the listing of networked devices 16 that form the networks 14 of the network environment. In some instance, security devices 12 will identify networked devices 16 within or outside of their respective networks 14 (as well as any connectable networks 14, 16), as static or dynamic objects. It should be understood that the terms "object" and "object definitions" may be used interchangeably herein. In general, a static object will comprise a static IP address (e.g., 10.2.0.1). Alternatively, a static object may also comprise a fully qualified domain names (FQDN). Dynamic objects may comprise dynamic IP addresses that can change over time. Regardless of whether security devices 12 use object definitions or some other naming conventions for identifying networked devices 16 associated with their associated networks 14, the management system 18 is configured to implement such definitions/conventions as necessary for consistent reference. Similarly, some security devices 12 may identify communication protocols used by the networks 14 by port numbers definition (e.g., a Transmission Control Protocol (TCP) port number or a User Datagram Protocol (UDP) port number). In general, networks 14 and their associated security devices 12 will use different port number definitions to identify communication protocols that may be used by the networks 14. As with the object definitions, the management system 18 may be configured to implement such port number definitions for consistent reference.

In addition, when normalizing the imported device configuration data for a given security device 12, the management device 18 may designate one or more portions of the network 12 being governed by the given security device 12 as being under the purview of the management system 18. For example, in some embodiments, it may be beneficial for the management system 18 to only manage security policies and/or security rules applicable for a first portion of a given network 14, while the security device 12 can independently manage the security policies and/or security rules applicable for a second, remaining portion of the given network 14. Such a separation may be established by the management system 18 through the creation of a "responsibility profile." The responsibility profile designates what portion(s) of the given network 14 and/or those applicable security policies and/or security rules that the management system 18 is responsible for managing. In more detail, some embodiments of the present invention provide for the management system 18 to manage only some of (or portions of) the security policies of any of the one or more security devices 12. In such embodiments, the management system 18 may manage some of (or a portion of) the security policies of the associated security device 12, while the security device 12 itself continues to manage the remaining (or remaining portions) of the security device's 12 security policies. Such decisioning of responsibility will be established and memorialized by the responsibility profile generated by the management system 18.

Furthermore, when normalizing the imported device configuration data for a given security device 12, the management system 18 may generate a "network intention profile" for each routable interface of the security device 12 and/or of the network 14 being governed by the security device 12. Generally, the network intention profile will include the imported routes for the security device 12, which may be in the form of a routing table. Such a routing table may comprise a data table that lists the routes from the networked devices 16 (e.g., nodes) within the relevant network 14 to relevant networked devices 16 inside or outside the network 14. In addition, the network intention profile may incorporate the use of "intention rules," which permit disambiguation of overly-broad or overly-narrow routes. In general, the intention rules are configured to include or exclude (e.g., permit or deny) one or more potential routes that exist within a network 14. For example, the intention rules may permit or deny specific routes that were included in the routes imported from the security device 12 for its associated network 14. Once the network intention profiles are generated by the management system 18 for one or more networks 14 of the network environment, the network intention profiles can be used to disambiguate portions of the networks 14 that may cause the management system 18 to incorrectly infer routes between networks 14 and/or networked devices 16 within the network environment.

Figure 7:
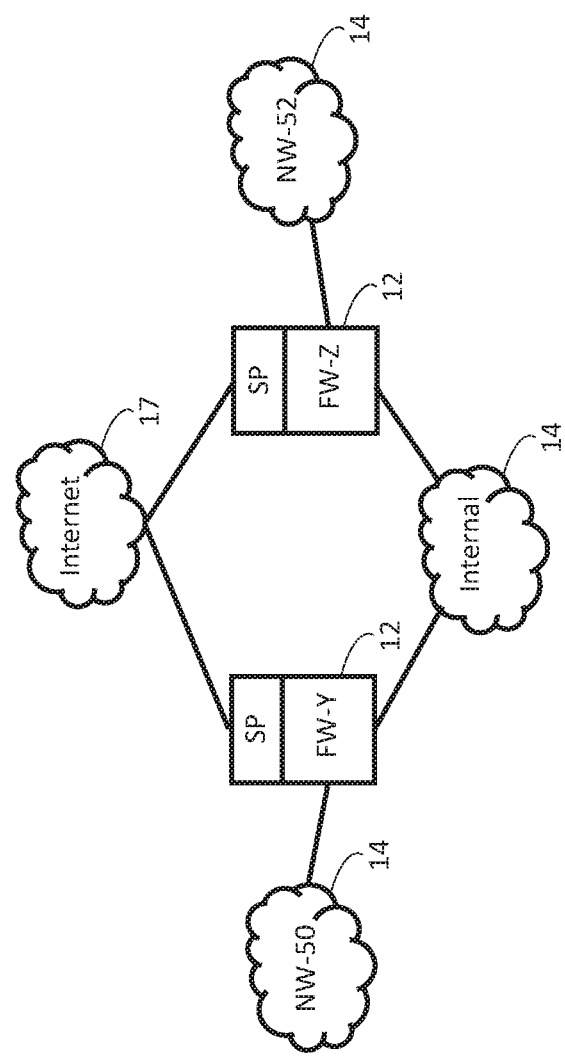
FIG. 7 is another exemplary network environment that may implement systems and methods of the present invention.

To illustrate a common routing issue arising with networks and how network intention profiles may be used to disambiguate inappropriate or overly-broad routes, an exemplary network environment is shown in FIG. 7. As shown, the network environment of FIG. 7 includes two security devices 12, namely firewalls "FW-Y" and "FW-Z." The firewalls "FW-Y" and "FW-Z" respectively monitor and control communication to and from two networks 14, namely "NW-50" and "NW-52." For instance, communication could be from networks "NW-50" and/or "NW-52" to the Internet (illustrated as a communications network 17). Of note, the firewalls "FW-Y" and "FW-Z" may both also monitor and control communicating to and from a separate "Internal" network 14 (e.g., a LAN). In general, the access requirements for network environment of FIG. 7 is to permit communication between the disparate networks (as overseen by the "FW-Y" and "FW-Z"). As such, this communication would include: Internal to "NW-50"; Internal to "NW-52"; Internal to Internet; "NW-50" to "NW-52"; and "NW-52" to "NW-50." The permissible data traffic flows for such communication might generally be defined in a routing table, which specifies the possible routes that could be used to accomplish the communication.

Often, such routes (as perhaps defined in a routing table) would not pose problems. However, in the case of communication between Internal to "NW-50" or between Internal to "NW-52", certain potential communication routes might result in communication through an unwanted and/or overly broad route. For instance, for Internal to "NW-50," the preferred route and/or most appropriate route would be for communication to travel from Internal directly to "NW-50" through "FW-Y." Unfortunately, another permissible route (as perhaps defined in a routing table) would be for communication to pass from Internal to "FW-Z," then to the Internet, then to "FW-Y," and finally to "NW-50." Such a route is overly broad and would, thus, generally be unwanted. To prevent such an unwanted communication route, embodiments incorporate the use of intention rules as part of a network intention profile. For instance, the intention rule may be to exclude the above-described overly-broad route. When the intention rule is applied to interfaces of the network environment (as perhaps defined in a routing table), restriction of the permitted routes through the network environment is refined/reduced so as to inhibit use of overly-broad or otherwise non-preferred routes.

It should be understood that although the above example, illustrated how intention rules can disambiguate overly-broad routes, such intention rules may also be used to disambiguate overly-narrow routes. For example, if the imported routing tables specify certain overly-narrow routes between components of a network, embodiments of the present invention may incorporate the use of intention rules to expand permissible routes that may be more efficient or otherwise beneficial. In addition, it should be further understood that multiple intention rules may be used. And, in some embodiments, certain intention rules may be used to modify other intention rules.

Furthermore still, when normalizing the device configuration data imported from the security devices 12, the management system 18 may also generate a "translation profile" for each of the applicable security devices 12 and/or networks 14. Such a translation profile will identify requirements for NAT and port translations for each security device 12 and/or network 14 in the network environment. In some embodiments, the translation profile may be obtained from the NAT and port translation information imported from the security devices 12 as part of the device configuration data. Alternatively, the translation profile may be manually created by users of the management system 18. Once a translation profile has been created, it may be used by the management system 18 to ensure that security rules provisioned from the management system 18 to the security devices 12 of the network environment (as discussed in more detail below) are being accurately formatted for accurate data traffic flow between the networks 14 of the network environment.

Upon the management system 18 importing and normalizing the device configuration data for a given network environment, embodiments provide for the creation of one or more access rules that will be used to form a global security policy for the network environment. As was noted above, access rules are abstracted rules that are based on access intentions for networked devices 16 within the networks 14 that form the network environment. Such access rules are generally abstracted from the objects (i.e., static and dynamic IP addresses) used by the security devices 12. In more detail, the management system 18 may create "assets" that are used to identify the objects imported from the security devices 12. The term "asset," as used herein, refers to an alphanumeric identifier or name that is generated to represent an object (i.e., an IP address, multiple IP addresses, and/or groups of IP addresses) included within one or more of the networks 14 of the network environment. As used herein, the term "asset" and "asset definition" may be used interchangeably. In some embodiments assets may be automatically generated by the management system 18 based on various criteria, such as by the information included in the device configuration data (e.g., from the network topology) imported from the security devices 12. Alternatively, a user of the management system 18 may manually create the assets via a GUI generated by the management system 18 and/or via the API that provides access to the management system 18. An exemplary table listing a collection of assets created for a network environment is shown by the first four rows (identified by reference numeral 60) of the table of FIG. 8. As illustrated, the first column 62 indicates a "name" of the asset. The second column 64 indicates that the name is associated with an asset "type." And the third column 66 provides an object definition (e.g., an IP address, multiple IP addresses, and/or groups of IP addresses) associated with the named asset.

Similarly, the management system 18 may create "services" that are used to identify the communication protocols imported from the security devices 12. Broadly, as used herein, the term "service" refers to an alphanumeric identifier or name that is generated to represent a communication port/protocol (i.e., a port/protocol name) and/or groups of communication port/protocols used within a network 14. As used herein, the term "service" and "service definition" may be used interchangeably. In some embodiments, services may be automatically generated by the management system 18 based on various criteria, such as by the information included in the device configuration data (e.g., network topology) imported from the security devices 12. Alternatively, a user of the management system 18 may manually create the services via a GUI generated by the management device 18 and/or via the API that provides access to the management system 18. An exemplary listing of services for a given network environment is shown by the three rows (identified by reference numeral 70) listed directly below the rows of assets shown in the table of FIG. 8. As illustrated, the first column 62 indicates a name for the service. The second column 64 indicates that the name is associated with service "type." And the third column 66 provides a service definition (e.g., a TCP port number) associated with the named service.

In some embodiments, the management system 18 may also incorporate the use of "Applications," in place of or in addition to services. In particular, the management system 18 may permit the creation of Applications that are used to identify specific types of data traffic. Such an Application may comprise an alphanumeric identifier or name that is generated to represent specified types of data traffic used within a network 14 and configured on a specific network security device 12. For example, such an Application may represent data traffic to/from Facebook or Cnn.com. Embodiments of the present invention may incorporate the use of such Applications within access rules so as to efficiently permit or deny communication data traffic represented by the Applications (e.g., to/from Facebook or Cnn.com).

Once the assets and services have been created, the management system 18 facilitates the creation of one or more access rules based on access intentions that will collectively define a global security policy. More generally, a listing of access rules can be created that are configured to be enforced, as will be discussed in more detail below. An exemplary listing of access rules is illustrated by Table 3 shown below and includes four access rules, which are identified by the rows of the table. It is noted that certain of the components of the access rules are defined in the table of FIG. 8. As noted above, a collection of all defined access rules can be collected/combined by the management system 18 (as discussed in more detail below) to create a global security policy for the network environment.

TABLE 3

| Rule | Source | Destination | Service | Action |
|---|---|---|---|---|
| 1 | Load Balancer | Webservers | HTTP | Allow |
| 2 | Load Balancer | Webservers | SSH | Deny |
| 3 | Any Internet | Load Balancers | HTTPS | Allow |
| 4 | Admins | Servers | SSH | Allow |

Turning to the access rules in more detail, such access rules may be created by users of the management system 18 via a GUI provided by the management system 18 and/or via the API providing access to the management system 18. Each access rule generally permits or denies access between two or more specified assets using a particular service, group of services, or application. As illustrated, each access rule may comprise an asset selected as a "source," an asset selected as a "destination," a "service" by which the selected source asset can access the selected destination asset (i.e., the communication protocol by which the assets are connected), and an "action" either allowing or denying such access. The source, the destination, the service, and the action may all be selected by a user interacting via a GUI provided by the management resource 18, such as by a pulldown menu, drag-and-drop feature, a look-up feature, manual text entry, or the like. In some embodiments, the management system 18 may provide suggestions for access rules, including providing suggestions for source, the destination, the service, and the action. In some embodiments, such suggestions may be generated by the management system 18 based on machine learning or other data analytics of previously used access rules. Alternatively, the source, the destination, the service, and the action may all be selected by a user interacting via the API providing access to the management system 18.

The first access rule from the Table 3 above indicates that the Load Balancer asset is capable of accessing the Webservers asset via HTTP, and the action for such access is to "allow" such access. The second access rule from Table 3 similarly indicates that the Load Balancer is capable of accessing the Webservers asset via SSH; however, the action for such access is to "deny" such access. The third access rule indicates that the Any Internet asset is capable of accessing the Load Balancers asset via HTTPS, and the action for such access is to "allow" such access.

Turning to the fourth access rule illustrated in Table 3, the access rule incorporates the use of "tags." As used herein, tags comprise variables (e.g., alphanumeric identifiers or names) that are used by the management system 18 to represent assets or groups of assets, as well as services or groups of services. However, in some embodiments, tags may not be used to represent services. In further embodiments, tags may be empty (i.e., defined so as not to include any assets, services, and/or other tags). In such embodiments, access rules may be created with such empty tags, with the intent of revising such empty tags in the future to include assets, services, and/or other tags. As used herein, the terms "tag" and "tag definition" may be used interchangeably. Such tags can be created by users via a GUI generated by the management system 18 and/or via the API providing access to the management system 18. Beneficially, the use of tags permits the management system 18 to efficiently create complex access rules that encompass groups of assets and/or services. An example of a tag is shown in the last line 72 of the table of FIG. 8. The first column 62 indicates that a "name" of the tag is Servers. The second column 64 indicates that the "name" is being used as a tag "type." The third column defines the Servers tag as representing the group of assets: Webservers and Load Balancers. Such assets were previously defined and shown in the table of FIG. 8.

By defining the Servers tag to include both the Webservers and Load Balancers assets, creation of complex access rules can be simplified. For instance, the fourth access rule from Table 3 above indicates that the Admins asset is capable of accessing the Servers tag via SSH, and the action for such access is to "allow" such access. Stated differently, the access rule permits the Admins asset to access both the Webservers asset and the Load Balancers asset via SSH. However, such permission is provided via only a single access rule, as opposed to two individual access rules. Thus, the use of tags can be used to efficiently create complex access rules and security policies in a time-efficient and accurate manner. However, it should be understood that in some embodiments, access rules can incorporate the use of multiple assets (e.g., as part of the source/destination) and multiple sources without requiring the implementation of tags. Nevertheless, the use of tags may be beneficial for allowing access by changing or updating the tag definitions without requiring that the access rules themselves be changed or updated.

In addition to the use of tags, some embodiments provide for the use of "groups." Groups may be similar to tags, in that groups may comprise variables (e.g., alphanumeric identifiers or names) that are used by the management system 18 to represent assets or groups of assets, as well as services or groups of services. However, unlike tags, groups will generally not be capable of being empty.

In addition to use of tags and/or groups, some embodiments provide for the use of "templates" to further simplify the creation of access rules. A template rule may comprise a variable that represents one or more access rules which are partially defined with a combination of "source-service-action" and/or "destination-service-action." For example, Table 4 below illustrates two template rules that are part of the same template. Template Rule 1 defines the destination-service-action as Webservers-HTTP-Allow. The missing value from Template Rule 1 is a single template variable, which for the example shown below in Table 4 is "Var1." Similarly, Template Rule 2 defines the source-service-action as Load Balancer-HTTP-Allow. The missing value from Template Rule 2 is a single template variable "Var1" (the same variable as in Template Rule 1). Thus, the management system 18 simplifies the creation of access rules via templates by only requiring for the variable Var 1 to complete the creation of all access rules specified by the Template.

TABLE 4

| Rule | Source | Destination | Service | Action |
| --- | --- | --- | --- | --- |
| Template Rule 1 | Var1 | Webservers | HTTP | Allow |
| Template Rule 2 | Load Balancer | Var1 | HTTP | Allow |

In some embodiments, each of the created access rules may be required to pass a compliance requirement before the access rule can be approved for implementation. In more detail, the management system 18 may, in some embodiments, compare each of the created access rules with a set of pre-established compliance rules to determine if each of the access rules is appropriate for implementation within the network environment. If a newly-created access rule is compared with the compliance rules, and the access provided by the access rule is permitted by the compliance rules, then the access rules may be identified as allowed for implementation. For example, a compliance rule may specify that communication from the Internet to the Load Balancers is allowed by any communication protocol. Because the third access rule from Table 3 above satisfies this compliance rule, the third access rule would pass the compliance requirements and would be allowed for implementation. In contrast, if any of the created access rules satisfies a restrictive compliance rule, then such access rules may be restricted from implementation within the network environment. For example, a compliance rule may specify that communication from the Internet to the Load Balancers is not allowed via an HTTPS communication protocol. Because the third access rule from Table 3 satisfies this restricted compliance rule, the third access rule would be restricted from being implemented. In some embodiments, any access rules that do not match with any compliance rules may only be implemented upon individual review and manual approval by a user of the management system 18.

Upon all necessary access rules being created and passing the compliance requirement, the management system 18 is configured to collect and/or combine all of such access rules together to form an asset-based global security policy that will represent the necessary enforcement requirements for each of the security devices 12 in the network environment. It is noted that a global security policy is considered asset-based when the policy is comprised of asset rules that are based on access requirements. In some embodiments, the management system 18 may save each version of an asset-based global security policy that is created by the management system 18 for a given network environment. Specifically, the management system 18 may iteratively create an asset-based global security policy each time device configuration data is imported and/or each time access rules are created or modified. As such, the management system 18 may be configured to store multiple versions of the asset-based global compliance policy. In some embodiments, the management system 18 may identify each version of an asset-based global compliance policy by various naming conventions, time-stamps, or the like.

Upon forming the asset-based global security policy, the management system 18 may generate an object-based global security policy by compiling the access rules from the asset-based global security policy. It is noted that a global security policy is considered object-based when the policy is comprised of security rules that are based on object definitions, as opposed to asset definitions. Specifically, as was previously discussed, objects generally comprise locations or addresses (e.g., IP addresses) of networks 14 and/or networked devices 16 within the network environment.

Many security devices 12 operate based on implementation of security policies or rules that use object definitions. As such, the management system 18 is configured to generate such an object-based global security policy so as to facilitate the provisioning of object-based security rules to the security devices 12 for implementation. Nevertheless, it should be understood that in some embodiments, the object-based global security policies may use some abstracted access rules as a result of some security devices 12 potentially using vendor-specific assets or tags when governing their associated networks 14.

The object-based global security policy may be created from the asset-based global security policy by: (1) replacing tags and assets with their static or dynamic objects definitions (e.g., IP addresses), (2) replacing dynamic objects with static objects, (3) replacing FQDNs with resolved names (e.g., using the Doman Name System (DNS)), and (4) replacing services with their communication protocol definitions (e.g., port numbers). Thus, the object-based global security policy will comprise a plurality of security rules, which are based on object definitions that can be used by the security devices 12 to govern their associated networks 14. Thereafter, the management system 18 may optimize the object-based global security policy by removing duplicate objects, such as by performing conflict analyses and merge connections. For example, if a static object has been defined both as an asset and also as part of a tag, the management system 18 may resolve such duplication to remove the redundancies within the object-based global security policy.

Upon creation of the object-based global security policy, the management resource is configured to determine which security devices 12 within the network environment are affected by the security rules included within the object-based global security policy. Such a determination may be made by determining whether the source/destination pair of objects for any one or more of the security rules is mapped to object pairs overseen by one or more of the security devices 12 within the network environment. In some embodiments, the interface protection profiles may also be analyzed to determine if the security rule is applicable for a given security device 12. In addition, the translation profiles may be analyzed to determine if any NAT or port translation requirements are applicable for those security devices 12 for which the management system 18 has determined security rules are applicable.

Upon determining that one or more security rules of the object-based security policy is properly mapped to a security device 12, the management system 18 may analyze the responsibility profiles to further determine whether each of the security rules are rules that are properly managed by the management system 18. As was discussed previously, embodiments may provide for the management system 18 to only manage portions of the of the networks 14 of the network environment and/or portions of the security policies and/or security rules used by the security devices 12 to govern the networks 14. Such decisioning of responsibility may be defined in the responsibility profiles created for each security device 12. Thus, the management system 18 may compare each security rule with applicable responsibility profiles to ensure that the security rules should be designated as rules that should be managed by the management system 18. If a suitable responsibility profile cannot be found, in some embodiments, such access rules may be restricted from implementation with the network environment 14.

After determining that the security rules of the object-based global security policy are properly mapped to appropriate security devices 12 within the network environment, and that the security rules are rules properly managed by the management system 18, the management system 18 may configure each of such security rules into a format appropriate for its associated security device 12. As was noted previously, the security devices 12 included in a given network environment may be provided by various vendors, such that the security devices 12 operate according to different command structures, syntaxes, etc. As such, the management system 18 is configured to format each of the security rules as necessary (e.g., to include appropriate command structures, syntaxes, etc.) for implementation on the appropriate security device 12.

For each security rule that has been identified and formatted for use with a given security device 12, the management system 18 may then determine if the current version of the security rule has been previously implemented on the given security device 12 by comparing the current version of the security rule with the security policy and/or security rules that were previously imported from the given security device 12 as part of the device configuration data. If the security rule was not previously implemented on the given security device 12, then the security rule will be identified as needing to be provided to the security device 12 for implementation. If the current version of the security rule was previously implemented for the given security device 12, a semantic differencing algorithm may be run by the management system 18 to determine whether the current version of the security rule is different from the previously-implemented security rule. If the current version of the security rule is different from the previous version of the security rule, the current version of the security rule is identified as needing to be provided to the security device 12 to update the associated security rule on the security device 12. If the current version of the access rule is the same as the previous version of the security rule, the current version of the security rule is identified as not needing to be provided to the security device 12.

The management system 18 is configured to perform the above-described comparison for each new security rule. Furthermore, if during such analysis, the management system 18 determines that the imported security policy for a given security device 12 includes a previously-implemented security rule that does not comport with any current security rule, then the management system 18 may be configured to delete the previously-implemented security rule from the security policy of the given security device 12.

As noted above, in some embodiments, the management system 18 may be configured to identify only a portion of the security rules of the object-based global security policy to be provisioned to the security devices 12. As such, the management system 18 can identify the provisioning of only a portion (or portions) of the security rules as necessary, in an incremental fashion. In some alternative embodiments, a full-replacement of the security rules may be required. As such, the management system 18 may be configured to identify that all of the security rules that form the object-based global security policy require provisioning to their appropriate security devices 12.

In addition to analyzing the updated security rules for potential changes, the management system 18 may also analyze the objects included in the updated security rules, as such objects are potentially shared across many different security rules for a given security device 12 or across multiple security devices 12. If an object used by one or more security devices 12 has been updated or newly added for the updated security rules, then the management system 18 may identify such objects as needing to be updated and/or added to the network topology of the associated security devices 12. Correspondingly, if any objects previously associated with any security devices 12 are no longer found in the updated security rules, then the management system may be configured to delete the previously-implemented objects from the network topology of the given security device 12.

Upon identifying the updated security rules (and/or associated objects) that are to be provided to the security devices 12, the management system 18 may transmit each of the updated security rules to the appropriate security device 12. As noted previously, such updated security rules will be formatted as necessary for the specific security device 12. In some embodiments, such transmission of the updated security rules may be performed over the communications network 17, and may be performed via API. In some embodiments, communication with each security device 12 may necessitate the use of individual, vendor-specific APIs.

As noted above, in some embodiments, the management system 18 may be configured to only provision a portion of the security rules of the object-based global security policy to the security devices 12. As such, the management system 18 can provision the security rules as necessary, in an incremental fashion. In some alternative embodiments, a full-replacement of the security rules may be required. As such, the management system 18 may be configured to provision all of the security rules that form the object-based global security policy to their appropriate security devices 12.

A method 100 for performing network security management in accordance with various embodiments of the present invention, is shown in FIG. 9 and described in more detail below. The steps of the method 100 may be performed in the order as shown in FIG. 9, or they may be performed in a different order. Furthermore, some steps may be performed concurrently as opposed to sequentially. In addition, some steps may not be performed. Some of the steps may represent code segments or executable instructions of the computer program or applications described above.

A step 102 may comprise importing device configuration data from a plurality of security devices 12 that monitor one or more networks 14 forming a network environment. The networks 14 may each include a plurality of interconnected networked devices 12. As discussed previously, the device configuration data for the security devices 12 may comprise network topologies for the networks 14 governed by the security devices 12, as well as security policies and/or security rules used by security devices 12 to govern the networks 14. The network topologies for the networks 14 may include a listing of the networked devices 16 (e.g., as may be defined by object definitions), routes, and interfaces for the networks 14. The importation of the device configuration data may be performed by the management system 18: manually (i.e., as needed), according to a predetermined or periodic schedule (e.g., every second, every minute, hourly, daily, weekly, monthly, etc.), or continuously by monitoring relevant indicators (.e.g., syslog) of the security devices 12.

A step 104 includes creating an abstracted asset definition for the networked devices 16 of the plurality of networks 14 Each asset definition may comprise an alphanumeric identifier corresponding with an object definition of the respective networked device 16. In some embodiments, the asset definition created for each networked device 16 will include an alphanumeric identifier or name for the networked device 16.

A step 106 includes creating one or more abstracted access rules, with the access rules using the asset definitions to define access between the networked devices 16 within the plurality of networks 14. More specifically, the abstracted access rules may define access between networked devices 16 based on the asset definitions created for the networked devices 16.

A step 108 includes compiling each of the access rules into a security rule using the object definitions to define access between the networked devices 16.

A step 110 includes identifying for each security rule which one or more security devices 12 are responsible for monitoring communication between the networked devices 16 defined in the security rule. In some embodiments, the step 110 includes identifying for each security rule which one or more security devices 12 are responsible for monitoring communication between the networked devices 16 defined by the object definitions included in the security rule. In some embodiments, upon such identification, the security rule will be formatted according to a particular, vendor-based format required for integration with the one or more security devices 12.

A step 112 includes transmitting the security rules to the appropriate security devices 12 identified in step 110. In some embodiments, the management system 18 may connect with the security devices 12 over the communications network 17 (e.g., via one or more APIs) to transmit the security rules to the security devices 12.

The above-described method 100 beneficially permits for efficient network security management of complex network environments. For example, given the network environment of FIGS. 4-6, the method 100 may be used to quickly and efficiently modify the security policies implemented by the security devices 12 as the network environment is itself modified. For example, starting with the network environment of FIG. 5, the security devices 12 (i.e., firewalls "FW-A," "FW-B," "FW-C," "FW-D," and "FW-E") are configured to implement their respective security policies so as to permit servers 40, 44 to communicate with server 42. As shown in the network environment of FIG. 6, however, server 42 has moved networks (i.e., from "NW-7" to "NW-8"). As was previously described, to maintain communication from servers 40, 44 to newly-positioned server 42, all five security policies of the security devices 12 require individual modification, which is a complicated and time-consuming process. Embodiments of the present invention, including method 100 described above, provide an efficient way in which modification of the security polices can take place. Further, such modifications can be implemented in an agile manner, with reduced complexity resulting in fewer errors.

Returning to the network topology of FIG. 5, the management system 18 may connect with each of the security devices 12 (i.e., firewalls "FW-A," "FW-B," "FW-C," "FW-D," and "FW-E") and import device configuration data from each of the security devices 12. As has been previously described, such device configuration data can include network topologies for the networks (i.e., "NW-1," "NW-2," "NW-3," "NW-4," "NW-5," "NW-6," "NW-7," and "NW-8") being governed by the security devices 12. Such network topologies will generally identify the location of the severs 40, 42, and 44 as being within respective networks "NW-1," "NW-7," and "NW-4." Generally, such location will be identified via object definitions (i.e., IP addresses) for each of the servers 40, 42, and 44. In addition to the network topologies, as part of the device configuration data, the management system 18 will also import the security policies and/or security rules being implemented on the security devices 12.

Assuming that the server 44 has been newly added, the management system 18 will require that an asset definition be created for the newly-added server 44. For purposes of illustration, it will be assumed that asset definitions Server0 and Server2 have previously been created respectively for servers 40 and 42. It should be understood that generally, servers 40 and 42 will each have an object definition (i.e., an IP address) used by the security devices 12, such that the asset definitions Server1 and Server2 will generally comprise abstracted definitions for the object definitions of servers 40 and 42. Regardless, since server 44 has been newly added, the management system 18 will be used to create an asset definition for server 44 (i.e., an abstracted definition for the object definition of server 44), which for purposes of illustration will be Server4.

As a next step, a user will create, via the management system 18, one or more access rules applicable for newly-added server 44 (for which has been created the abstracted asset definition Server4). As was described previously, access rules are abstracted security rules that are based on the access intentions of the network environment. The access intention for newly added server 44 is that server 44 should be permitted to communicate with server 42. An exemplary access rule is illustrated below in Table 5 to facilitate such access intention. Specifically, the source is set as the newly-created asset definition for server 44 (i.e., Server4). The destination is set as previously-created asset definition for server 42 (i.e., Server2). The service is set as the abstracted service definition HTTP, which may have been previously created to be an abstracted definition of a communication protocol (e.g., protocol/port number). Finally, the action is set to "Allow," which permits the access to proceed if the access rule has been satisfied.

TABLE 5

| Source | Destination | Service | Action |
| --- | --- | --- | --- |
| Server4 | Server2 | HTTP | Allow |

It should also be noted that in a previous version or instances of the network environment (e.g., as shown in FIG. 4), the management system 18 would have created an access rule providing access from server 40 to server 42. An exemplary access rule for permitting such access is shown below in Table 6. As should be understood, in some embodiments, the management system 18 may store access rules from previous versions of networking environments (e.g., as part of previously versions of asset-based global security policies). Thus, every applicable access rule does not need to be re-created by the management system 18 and/or the user upon each iteration of embodiments of the present invention (e.g., each iteration of method 100). Instead, during each iteration, access rules can be added, modified, or removed so as to build on the previous iteration of the asset-based global security policy. Such a feature is helpful in facilitating efficient modifications of the asset-based global security policy, and thus efficient modifications of the object-based global security policy, which includes the security policies and/or security rules eventually provisioned to and implemented on the security devices 12.

TABLE 6

| Source | Destination | Service | Action |
| --- | --- | --- | --- |
| Server0 | Server2 | HTTP | Allow |

It should be further noted that instead of creating the access rule shown in Table 5, which uses asset definitions for the source and destination, some embodiments may permit the use of tags. As was previously described, tags may comprise abstracted definitions of groups of assets. Thus, for instance, a tag "Server0/4" could be created to represent the group of the two assets Server0 and Server 4 (or alternatively to represent the two object definitions (i.e., IP addresses) for server 40 and server 44). Using the tag definition as the source, a single access rule can be created, as illustrated in Table 7 below, which would represent two access intentions, namely both server 40 and server 44 are allowed to access server 42.

TABLE 7

| Source | Destination | Service | Action |
| --- | --- | --- | --- |
| Server0/4 | Server2 | HTTP | Allow |

Regardless, upon the access intention being implemented via the creation of an access rule, embodiments provide for the management system 18 to next collect each of the access rules created for the network environment (e.g., the network environment of FIG. 5) into an asset-based global security policy. The asset-based global security policy can then be compiled into an object-based global security policy that includes updated security rules that can be provisioned to and implemented by the security devices 12 of the network environment so as to carry out the access intentions defined by the access rules. Such security rules will be formatted by the management system 18 to comport with vendor-specific command structures and syntaxes of the security devices 12. Generally, such security rules will include reference to the object definitions (i.e., IP addresses) of the networked devices 16 within the network environment. With respect to the network environment of FIG. 5, the updated security rules will include reference to the object definitions for servers 40, 42, and 44.

Next, the management system 18 can identify, for each of the updated security rules, which security devices 12 within the network environment are responsible for monitoring communication between the networked devices 16 defined by the object definitions included in the updated security rules and/or otherwise defined in the updated security rules. For example, for the access rule illustrated in Table 5, the management system 18 may create one or more security rules (based on object definitions for the source, definition, and service) and determine which of the security devices 12 should receive the updated security rules to facilitate the access intention represented by the access rule. Thus, for the access rule of Table 5, which specifies that server 44 should be able to communicate with server 42, the management system 18 may determine that security devices "FW-B," "FW-C," and "FW-D" will each require an updated security rule to permit such communication. Upon making such determination, the management system 18 may transmit the updated security rules to each of the applicable security devices 12 within the network environment.

Beneficially, the use of the abstracted access rules, as provided by embodiments of the present invention, permits the efficient modification of security policies upon changes to the network environment. For instance, with respect to the network environment of FIG. 6, as was previously discussed, the server 42 is moved from "NW-7" to "NW-8," which will generally require that the security policies of all five security devices 12 be changed. The management system 18 may import device configuration data from each of the security devices 12. Based on such device configuration data, and particularly based on the network topologies included in the device configuration data, the management system 18 will recognize that server 42 has moved from "NW-7" to "NW-8," which will require modification of the security policies of each the security devices 12. However, no new access rules are necessary because the access rules from Table 5 and Table 6 were previously created to establish the access intentions that both servers 40 and 44 were required to communicate with server 42. As such, the management system 18 can collect and compile the previously created access rules into a set of updated security rules. The management system 18 will identify which updated security rules are required to be provided to which security devices 12, and the management system 18 will transmit such updated security rules to the appropriate security devices 12.

Thus, the management system facilities efficient network security management of network environments by automating the generation and provisioning of updated security rules based on access intentions of the network environment. Instead of a user being required to manually access each of the security devices 12 to manually change the security policies, the management system 18 can use the access intentions of the network environment (as established via the access rules) to automate the generation and provisioning of updated security rules to the appropriate security devices 12.

In some embodiments, the generation and provisioning of updated security rules will only be performed by the management system 18 when the network environment has changed or when access rules are created or modified. For example, the management system 18 may be configured to import device configuration data manually (e.g., when instructed by a user), on a scheduled or periodic basis (e.g., hourly, daily, weekly, monthly, etc.), or continuously by monitoring relevant indicators (.e.g., syslog) of the security devices 12. If the management system 18 determines from the device configuration data that no changes to the network environment have been made since the previous importation of device configuration data, then the management system 18 may determine that no update security rules are required to be generated and provisioned to the security devices 12 of the network environment.

Another instance in which updated security rules may be generated and provisioned to appropriate security devices 12 is when new access rules are created or when access rules are modified. To accomplish such, a user of the management system 18 may instruct the management system 18 to import the device configuration data from the security devices if required. In addition, the user can create the new access rules (as has been described herein, and as particularly been described in method 100). Upon creating the new access rules, the management system 18 can be configured to generate an updated object-based global security policy, and to provision the updated security rules from the policy to the appropriate security devices 12. Such provisioning may be performed manually (e.g., when instructed by a user), on a scheduled, or periodic basis (e.g., hourly, daily, weekly, monthly, etc.), or continuously (e.g., as soon as the access rule has been created).

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed is:

1. A system for managing network security, said system comprising:
   a plurality of networks, each comprising one or more networked devices;
   a plurality of security devices configured to monitor data traffic into and out of the plurality of networks; and
   a computing device in communication with the plurality of security devices, the computing device comprising at least one processing element and at least one memory element, the at least one processing element configured to execute a computer program stored in the at least one memory element such that the computing device is configured to:
   (a) import device configuration data into a management system from the plurality of security devices, wherein the device configuration data comprises network topologies for the plurality of networks, wherein the network topologies include object definitions for the networked devices included in the plurality of networks,
   (b) create an abstracted asset definition for the networked devices of the plurality of networks, with each asset definition comprising an alphanumeric identifier corresponding with an object definition of the respective networked device,
   (c) create one or more abstracted access rules, wherein the access rules implement access requirements that define intentions for communication between the networked devices included in the plurality of networks, and wherein the access rules incorporate the asset definitions within the access rules such that the access rules define access between the abstracted asset definitions of the networked devices included in the plurality of networks,
   wherein the access requirements are provided by a user of the management system to define the intentions for communication between the networked devices included in the plurality of networks,
   (d) compile each of the access rules into one or more security rules, wherein the security rules use the object definitions to define access between the networked devices included in the plurality of networks,
   (e) identify for each security rule, which security device from the plurality of security devices is responsible for monitoring data traffic between the networked devices defined in the security rule,
   (f) transmit the one or more security rules to the security devices identified in step (e).

2. The system of claim 1, wherein the plurality of security devices comprise firewalls.

3. The system of claim 1, wherein the one or more security rules comprise firewall rules.

4. The system of claim 1, wherein the networked devices included in the plurality of networks comprise networked computing devices that include processing elements for processing the data traffic.

5. The system of claim 1, wherein the device configuration data further comprises security policies for the plurality of security devices.

6. The system of claim 1, wherein the one or more security rules comprise updated security rules, and wherein the device configuration data further comprises previously-implemented security rules.

7. The system of claim 1, wherein the object definitions of the networked devices included in the plurality of networks comprise internet protocol (IP) addresses.

8. The system of claim 1, wherein the access rules comprise a first asset definition as a source and a second asset definition as a destination.

9. The system of claim 8, wherein the access rules further comprise an abstracted service definition indicative of a communication protocol used for access between the source and the destination.

10. The system of claim 8, wherein the access rules further comprise an action indicative of whether the access between the source and the destination is allowed or denied.

11. The system of claim 1, wherein for the security devices identified in step (e), the computing device is further configured to determine whether network address translations (NATs) are applicable for the identified security devices.

12. The system of claim 1, wherein the computing device is further configured to format the one or more security rules according to command structures and/or syntaxes required for implementation by the plurality of security devices.

13. The system of claim 1, wherein the computing device is configured to import device configuration data from the plurality of security devices on a periodic basis.

14. The system of claim 1, wherein the computing device is configured to transmit the one or more security rules to the identified security devices on a periodic basis.

15. The system of claim 1, wherein one or more of the plurality of networks comprise local area networks.

16. The system of claim 1, wherein the computing device is in communication with the plurality of security devices via a communications network.

17. The system of claim 16, wherein the communications network comprises a wide area network.

18. The system of claim 1, wherein the computing device is in communication with the plurality of security devices via one or more application programming interfaces (APIs).

19. The system of claim 1, wherein the access rules comprise one or more tags, wherein each tag comprises two or more asset definitions.

20. The system of claim 1, wherein the computing device is further configured to receive, from a user of the management system, updated abstracted access rules configured to implement update access requirements.

21. A computer-implemented method for performing network security management for a plurality of networks, each comprising one or more networked devices, wherein each of the networks includes one or more security devices configured to monitor data traffic into and out of the plurality of networks, said method comprising the steps of:
(a) importing device configuration data into a management system from the plurality of security devices, wherein the device configuration data comprises network topologies for the plurality of networks, wherein the network topologies include object definitions for the networked devices included in the plurality of networks;
(b) creating an abstracted asset definition for the networked devices of the plurality of networks, with each asset definition comprising an alphanumeric identifier corresponding with an object definition of the respective networked device;
(c) creating one or more abstracted access rules, wherein the access rules implement access requirements that define intentions for communication between the networked devices included in the plurality of networks, and wherein the access rules incorporate the asset definitions within the access rules such that the access rules define access between the abstracted asset definitions of the networked devices included in the plurality of networks,
wherein the access requirements are provided by a user of the management system to define the intentions for communication between the networked devices included in the plurality of networks;
(d) compiling each of the access rules into one or more security rules, wherein the security rules use the object definitions to define access between the networked devices included in the plurality of networks;
(e) identifying for each security rule, which security device from the plurality of security devices is responsible for monitoring data traffic between the networked devices defined in the security rule; and
(f) transmitting the one or more security rules to the security devices identified in step (e).

22. The computer-implemented method of claim 21, further including the step of comparing each of the created access rules with a set of compliance rules to determine if the access rules are appropriate for implementation.

23. The computer-implemented method of claim 21, further including the step of comparing each security rule with the device configuration data to determine if new or modified security rules should be transmitted to the security devices identified in step (e).

24. A non-transitory computer-readable storage medium with an executable program stored thereon for performing network security management for a plurality of networks, each comprising one or more networked devices, wherein each of the networks includes one or more security devices configured to monitor data traffic into and out of the plurality of networks, wherein when the program is executed by a processor, the processor is configured to:
(a) import device configuration data into a management system from the plurality of security devices, wherein the device configuration data comprises network topologies for the plurality of networks, wherein the network topologies include object definitions for the networked devices included in the plurality of networks;
(b) create an abstracted asset definition for the networked devices of the plurality of networks, with each asset definition comprising an alphanumeric identifier corresponding with an object definition of the respective networked device;
(c) create one or more abstracted access rules, wherein the access rules implement access requirements that define intentions for communication between the networked devices included in the plurality of networks, and wherein the access rules incorporate the asset definitions within the access rules such that the access rules define access between the abstracted asset definitions of the networked devices included in the plurality of networks,
wherein the access requirements are provided by a user of the management system to define the intentions for communication between the networked devices included in the plurality of networks;

(d) compile each of the access rules into one or more security rules, wherein the security rules use the object definitions to define access between the networked devices included in the plurality of networks;

(e) identify for each security rule, which security device from the plurality of security devices is responsible for monitoring data traffic between the networked devices defined in the security rule; and (f) transmit the one or more security rules to the security devices identified in step (e).

25. The non-transitory computer-readable storage medium of claim 24, wherein the processor is further configured to compare each of the created access rules with a set of compliance rules to determine if the access rules are appropriate for implementation.

26. The non-transitory computer-readable storage medium of claim 24, wherein the processor is further configured to compare each security rule with the device configuration data to determine if new or modified security rules should be transmitted to the security devices identified in step (e).

\* \* \* \* \*